United States Patent [19]
Stephens et al.

[11] Patent Number: 5,373,825
[45] Date of Patent: Dec. 20, 1994

[54] INTERNAL COMBUSTION ENGINES

[75] Inventors: Robert Stephens, Birmingham; Thomas Cox; David C. Cox, both of Warley, all of England

[73] Assignee: Spirrit Environmental Technology Limited, Redditch, England

[21] Appl. No.: 30,360
[22] PCT Filed: Sep. 18, 1991
[86] PCT No.: PCT/GB91/01601
    § 371 Date: Mar. 17, 1993
    § 102(e) Date: Mar. 17, 1993
[87] PCT Pub. No.: WO92/05360
    PCT Pub. Date: Apr. 2, 1992

[30] Foreign Application Priority Data

Sep. 19, 1990 [GB] United Kingdom ............... 9020430
Nov. 10, 1990 [GB] United Kingdom ............... 9025158
Dec. 21, 1990 [GB] United Kingdom ............... 9027884
Apr. 29, 1991 [GB] United Kingdom ............... 9109220
Aug. 9, 1991 [GB] United Kingdom ............... 9117198
Aug. 23, 1991 [GB] United Kingdom ............... 9118193

[51] Int. Cl.$^5$ ........................... F02G 5/00; F02M 31/00
[52] U.S. Cl. ........................... 123/549; 123/525; 123/557
[58] Field of Search ............... 123/549, 525, 557, 1 R, 123/1 A, 514

[56] References Cited
U.S. PATENT DOCUMENTS

| | | | |
|---|---|---|---|
| 4,267,802 | 5/1981 | Garretson | 123/557 |
| 4,315,490 | 2/1982 | Webber et al. | 123/549 |
| 4,338,905 | 7/1982 | Urich | 123/525 |
| 4,356,805 | 11/1982 | Kler | 123/525 |
| 4,370,970 | 2/1983 | Kunz | 123/557 |
| 4,398,523 | 8/1983 | Henson | 123/549 |
| 4,524,730 | 6/1985 | Doell et al. | 123/525 |
| 4,550,691 | 11/1985 | McWade | 123/525 |
| 4,567,857 | 2/1986 | Houseman et al. | 123/1 A |
| 4,706,636 | 11/1987 | Davis | 123/514 |
| 4,748,961 | 6/1988 | Headley et al. | 123/557 |
| 4,784,092 | 11/1988 | Pitti | 123/525 |

FOREIGN PATENT DOCUMENTS 2826976 3/1980 Germany .
8503330 8/1985 WIPO .

Primary Examiner—Tony M. Argenbright
Assistant Examiner—M. Macy
Attorney, Agent, or Firm—Renner, Kenner, Greive, Bobak, Taylor & Weber

[57] ABSTRACT

A gasifying device is fed oil from the return spill rail of a diesel engine, or from a reservoir of oil and gasifies the lighter fractions of the oil using an electrical heater, the gasified products being fed to the air intake manifold of the engine. In one embodiment unvaporized oil is fed from the gasifying device to the oil supply line to the engine, thereby avoiding a build-up of heavy oil components in the device. Several embodiments are disclosed. The device improves the handling performance of a vehicle fitted with the engine, the exhaust emissions, and the fuel economy. The device may also be fitted to a petrol engine.

15 Claims, 13 Drawing Sheets

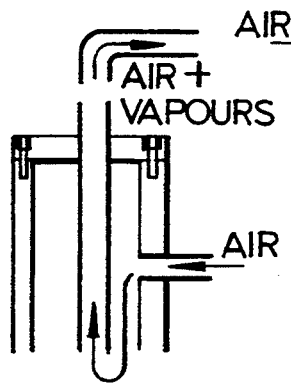
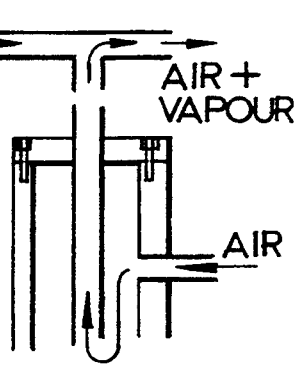
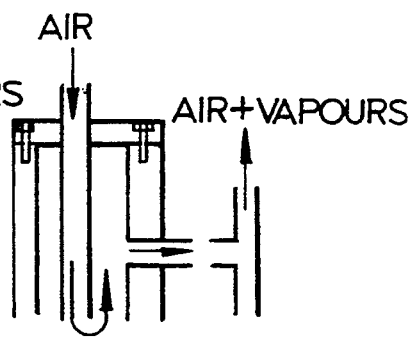
FIG.19a.  FIG.19b.  FIG.19c.
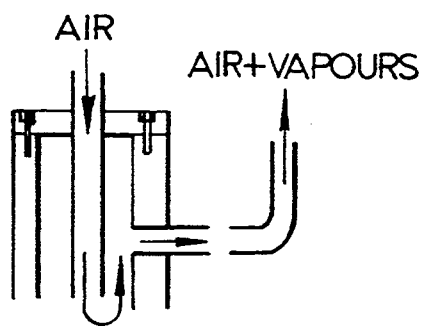
FIG.19d.
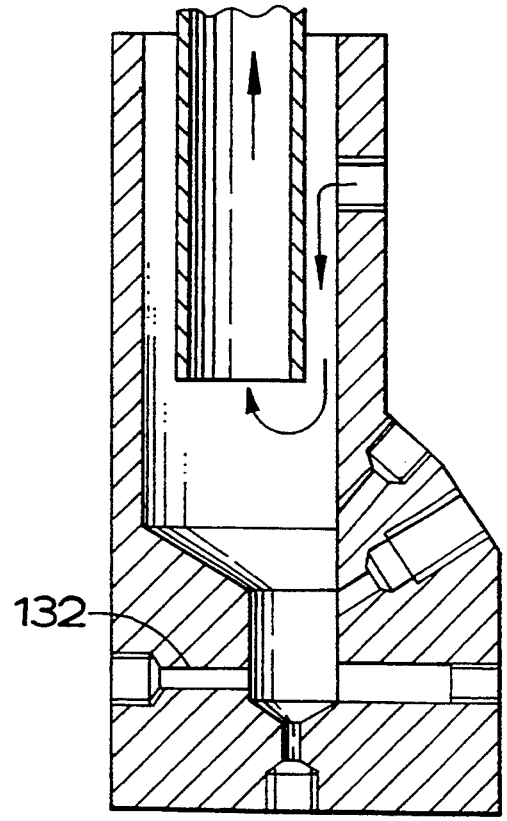
FIG.17.
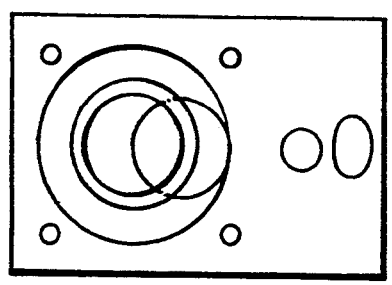
FIG.18.

INTERNAL COMBUSTION ENGINES

This invention relates to internal combustion engines and to add-on devices adapted to be used in conjunction with them to improve their performance, and also to vehicles incorporating such engines.

There have been very many proposals to provide an add-on device to an internal combustion engine to improve its power, fuel economy, or reduce emissions. One of the known proposals is that of French patent No. 576 434 which discloses a device which takes carburetted fuel and passes it into an electrically heated pipe so as to vaporise the droplets of fuel before delivering it to the engine. The engine can be run on light or heavy fuel, the electrical heater being disconnected when light fuel is used. The proposed device suffers from the problem of coking up due to the deposition of unburned solid residue.

It is also known from GB 2 169 654 to provide a complex system to add mineral oil vapour to the air inlet to an internal combustion engine, the mineral oil vapour being produced at a relatively low temperature in a multiple turn helical coil. The mineral oil preferred by the proprietors of GB 2 169 654 is paraffin. This too is liable to suffer from problems of coking up.

The present invention provides a relatively simple add-on device to improve the performance of an internal combustion engine.

According to a first aspect of the invention we provide a device for attachment to the air supply of an internal combustion engine, the device comprising chamber means defining a volatising chamber, an energy source provided in the chamber, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is gasified in the chamber and the air/gasified oil mixture leaves the chamber via the gas/vapour outlet, the gas/vapour outlet being adapted for connection to the air supply of an internal combustion engine.

Preferably the energy source is an electrical heater or glow plug.

It has been found that adding gasified oil to the air drawn into an engine improves the burning of the conventional petrol or diesel fuel in the engine. In many engines the conventional fuel can be more completely burned when the gasified oil is added.

Preferably the oil which is added is diesel fuel oil, but a range of hydrocarbons can be totally gasified by appropriate selection of the power of the electrical heater.

In a preferred embodiment the delivery means delivers the oil in droplets to the chamber. The delivery means preferably adds the oil to the air before it enters the chamber.

An outer chamber containing the oil may surround the volatilising chamber.

The fluid inlet may comprise a venturi or the like which creates suction adjacent an oil inlet orifice of the venturi thereby drawing oil into a stream of air entering the chamber. The oil inlet may be at about the mid-point of a venturi restriction. The oil may be pre-heated before it enters the venturi.

The heater may be surrounded by a metal sleeve. The sleeve may serve to create a large area of metal at substantially the same high temperature so that the oil droplets entrained in the incoming air stream are gasified at substantially the same temperature, no matter where they hit the sleeve. A portion of the oil (b.r 163°–390° C. for some European diesel fuel) entering the chamber (annular space temperature substantially 250° C.) will be vaporised before reaching the surface of the sleeve.

The chamber may be generally annular in a cross-section and may be defined between the outer surface of the sleeve and the inner surface of a surrounding wall.

The oil may be drawn from the vehicle's diesel fuel tank, or from a reservoir of oil, and an oil return passageway may be provided from the chamber to the reservoir so that oil which condenses in the chamber, or which is not gasified, can be returned to the reservoir. This should not normally be necessary and can cause problems with air entrainment.

The oil inlet orifice may be provided in a removable component so that the device may be provided with oil inlet orifices of different sizes for use with engines of different capacities.

The device may have a float chamber for oil, the fluid inlet being fed from the float chamber.

In another preferred embodiment the delivery means supplies oil to a pool or reservoir of oil in the volatising chamber which pool of oil is bodily heated by the heater.

Preferably the heater drives off the lighter components of the oil (when it is a mixture of components with different boiling points, as is diesel oil) and leaves behind the heavier components.

The delivery means may include a float chamber to control the depth of the pool of oil in the chamber. The volatising chamber may have a mixing region in which vapours driven off from the oil in the chamber mix with or are entrained in air entering the chamber via an air inlet.

The delivery means may be fed oil from a fuel return line leading from the engine.

The heater preferably extends in the pool of oil at an angle to the surface of the pool. The heater is preferably provided at or near the surface of the pool and may dip into the pool from above.

Inclining the heater relative to the surface of the pool increases the surface area of the heater in the surface region of the pool, which can improve the boiling of the light fractions of the oil in the surface region of the pool. The heater may be provided in a bore formed in a housing or body defining the pool and/or mixing region.

Alternatively the level of the oil may be controlled so as to substantially cover the hot portions of the heater.

A liquid oil extraction line may be provided to enable oil in the pool to leave the chamber whilst still liquid. The extraction line is preferably provided at or towards the bottom of the chamber, and may deliver oil (possibly via an electric pump) to the main fuel tank or the normal fuel line to the engine, preferably downstream of a fuel filter. In the latter way heated liquid oil from the chamber is added to the fuel normally entering the engine in the conventional way (as well as gasified oil being added to the air entering the intake manifold). Problems associated with the build up of residues may be alleviated by such a construction since the heavier components of the oil are generally not re-circulated to undergo a subsequent gasification heating, but are instead burned. Thus oil in the fuel tank is broadly speaking only heated once.

The level of oil in the pool is preferably at least about 15 mm above the inlet of oil to the pool and most preferably about 15 to 20, 20 to 25 or 25–30 mm above the oil inlet. The inlet of oil to the pool is preferably via a small bore pipe.

These measures help to reduce the chance of air bubbles being entrained in the liquid oil extracted from the pool, which can be important when the extracted oil reaches the injector pump for delivery to the engine. If the injector pump is not "self-bleeding" it is best to return oil from the heater to the vehicle's fuel tank.

Alternatively the extraction line may deliver oil to a reservoir, which may be the same reservoir as that which provides the oil to the delivery means. Thus unvaporised oil may be recirculated, but in order to avoid a build-up of involatile material it is desirable periodically to renew the oil in the reservoir (exchange it for fresh oil).

A pump may be provided to extract liquid oil from the volatising chamber via the extraction line and preferably should be provided with a cooling coil. The pump may be controlled by an electronic controller which may be arranged to keep the temperature of the oil in the pool substantially constant by controlling the pump and/or the heater. The temperature is preferably kept at about 210° C.–280° C., and more preferably at 230° C.–260° C., and most preferably at about 250° C.

The volume of oil in the pool is preferably only a few cubic centimeters, for example 5–25 cc, most preferably about 10 cc ±a few cc.

This enables the heater to produce gasified oil in a short time (for example 5–25 seconds) and so avoids a long warm-up time for the device when the engine is first started.

The path for liquid oil leaving the pool preferably includes a restrictor to limit the flow rate of liquid oil. There is also preferably a filter up stream of the restrictor to protect the restrictor from blockage. Such a restrictor also allows the flow rate to be varied by varying the size of the restrictor. The balance of flows of liquid oil into and out of the volatising chamber are governed by the rate of supply to the float chamber and the restrictor(s) in the exit line, for a given pump.

The ratio of oil leaving the pool as liquid to that leaving as gasified oil is preferably in the range, 50:1 to 10:1.

In general, the greater the flow-through of liquid in the pool the better, but there can be refinements on this general concept.

We may wish to control the viscosity of oil entering the pool, and/or the system's pump, so as to achieve a more constant viscosity of oil, and hence more uniform flow characteristics (the temperature of oil entering the pool can vary according to the operating conditions and history of the engine if no control is provided). We may chose to control the viscosity of the oil by controlling the temperature of the oil entering or leaving the pool, for example by providing a secondary heater in the liquid oil supply line to the pool.

The control of the temperature of the oil entering the pool over the operating conditions of the engine could additionally or alternatively be achieved by insulation.

The ratio of conventional fuel burned in the engine which enters the engine in the conventional way (such as carburetted or injected petrol or injected diesel) to that burned entering the engine as a gas or vapour is preferably in the range 333:1 to 33:1. In one example trial a petrol engine was at the higher end of this range and a diesel engine at the lower end.

We may have a vapour outlet pipe which is adjustable or variable relative to the pool (for example of variable height). This adjustment may be done as the device is fitted to the engine, the outlet tube thereafter being in a fixed position. The height of the tube is normally determined by experiment and usually depends upon the engine's suction. Alternatively, the outlet pipe could be truely adjustable, even after fitting to the engine.

The gas/vapour outlet is in most cases preferably spaced from the surface of the pool of oil by between about 25 mm to 50 mm; for wider bore gas/vapour outlets this space could be reduced. If the outlet is too close to the surface of the pool we have found that the vapour which is drawn off is too "wet"—it contains a very fine mist of droplets of oil. Wet vapour has been found to be undesirable in certain circumstances since it might result in deposits and residues in the flow path from the device to the engine's cylinders and may cause substantial dilution of the engine's sump oil.

If the outlet is too far away from the surface of the pool we have found that there seems to be a marked reduction in the amount of oil vapours sucked up by the engine. Both of these phenomena are somewhat surprising.

Preferably the outlet comprises a tube extending into a main body defining the volatising chamber. The body preferably defines the air inlet means which is preferably above the level of the bottom of the tube.

When the delivery means includes a float chamber, for example to control the level of oil in the pool of oil, the float chamber may be defined in the body of the device, for example by a float chamber housing attached to a vaporisation chamber housing.

According to a second aspect the invention consists in an internal combustion engine having a device in accordance with the first aspect of the invention, the device introducing a mixture of air and gasified oil into the air inlet of the engine, and the engine being fed conventional petrol or diesel oil fuel by its carburettor or fuel injector means.

According to a further aspect of the invention we provide a multi-cylinder internal combustion engine which comprises, in combination:

(a) means for conducting a gasified hydrocarbon fluid or fluid derivative thereof, including air to each of said engine cylinders;

(b) an electrical heater;

(c) a main fuel tank for the storage and carriage of the fuel which is burnt in said cylinders in order to produce heat which is converted into mechanical power and to supply fluid for gasification when the fuel is diesel oil;

(d) a heated chamber containing the said heater supplied with said fluid from the main fuel storage tank, or from an auxiliary storage tank, by way of a float chamber connected to said heated chamber, via an emulsion tube which is connected to a main air inlet to the chamber, the emulsion tube giving added control over the system's input of fluid droplets and air to the said heated chamber; and (e) intermediate means connecting said engine cylinders to said heated chamber and conducting gasified fluid from the said heated chamber to said engine cylinders; whereby said fluid which passes into said heated chamber is gasified therein, the gasified fluid thereafter passing through the intermediate means to said engine cylinders for burning with the fuel/air mixture.

It will be appreciated from the foregoing that we could provide the chamber as an enveloping chamber so that the fluid is heated in the chamber before it is delivered to the venturi or carburettor system.

According to a still further aspect of the invention we provide a generator for producing a gasified combustion promoter for an internal combustion engine; said generator comprising a chamber containing an electrical heater, said chamber being supplied with oil, the said fluids being introduced to said chamber by way of a float chamber feeding to a means with the fluid inlet aperture and air-intake tube of a basic carburettor system provided with an emulsion tube that gives added control over the input of said fluid droplets in air induced by the suction of the active engine to the said heated chamber which means gasifies the said fluid which is drawn by the engine's air suction into an intermediate means connected both to the said heated chamber and to said engine for burning with the fuel/air mixture.

When the engine is a diesel engine, the chamber may be supplied with oil from the main fuel storage tank, or with an alternative hydrocarbon fluid or fluid derivative thereof from an auxiliary storage tank. When the main fuel is not diesel oil, the chamber is supplied with diesel oil or with the alternative hydrocarbon from an auxiliary storage tank.

It will be appreciated that the chamber may surround or envelope the heater, and that the diesel oil may be pre-heated before being vaporised or gasified.

According to a further aspect of the invention we provide an internal combustion engine having an air inlet, heating means for gasifying hydrocarbons, gas delivery means for delivery of gasified hydrocarbons from the heating means to an air stream leading to the air inlet of the engine, entraining air supply means supplying air to the heating means which air entrains gasified hydrocarbons and leaves the heating means via the gas delivery means, and pressure generating means for generating higher than atmospheric pressure; the entraining air supply means collecting air at higher than atmospheric pressure from the pressure generating means and blowing it into the heating means.

Preferably the pressure generating means comprises air compression means, such as a turbocharger or supercharger, provided in a main air inlet line leading to the air inlet of the engine; the entraining air supply means taking relatively high pressure air from the main air inlet line downstream of the air compression means.

Thus the air is blown into the heating means, preferably through a controlling restrictor.

Preferably the delivery means delivers gasified hydrocarbons to the main air supply line upstream of the compression means.

Alternatively the pressure generating means may comprise a fan or other impeller provided adjacent the air supply entraining means. In such an arrangement there need be no turbocharger to provide higher than atmospheric pressure.

Preferably the heating means comprises a device or generator in accordance with a preceding aspect of the invention.

According to yet another aspect the invention comprises a method of improving the performance of an internal combustion engine comprising adding gasified diesel oil to the air which is a component of the fuel/air charge which is burnt in the engine.

Preferably the gasified diesel oil is always available to the air which is a component of the fuel/air combustion charge, rather than being supplied intermittently.

We were extremely surprised to find that normal diesel DERV was the best fuel to gasify and add to the air. We had previously thought that the best oil to use was a relatively volatile oil, such as paraffin, and had gone to great expense to use only expensive mineral oils in our tests. The revelation that common (higher boiling) diesel DERV would not only work, but work much better than anything else we have tried was very surprising.

The method of improving the performance of an internal combustion engine may comprise improving its fuel efficiency. Alternatively or additionally we may improve the exhaust emissions of the engine, and when the engine is a diesel engine we may reduce the particulate pollutants in the emissions. Additionally or alternatively the method may improve the running of the engine and its delivery of power.

Some embodiments of the invention will now be described by way of example with reference to the accompanying drawings of which:

Figure 1:
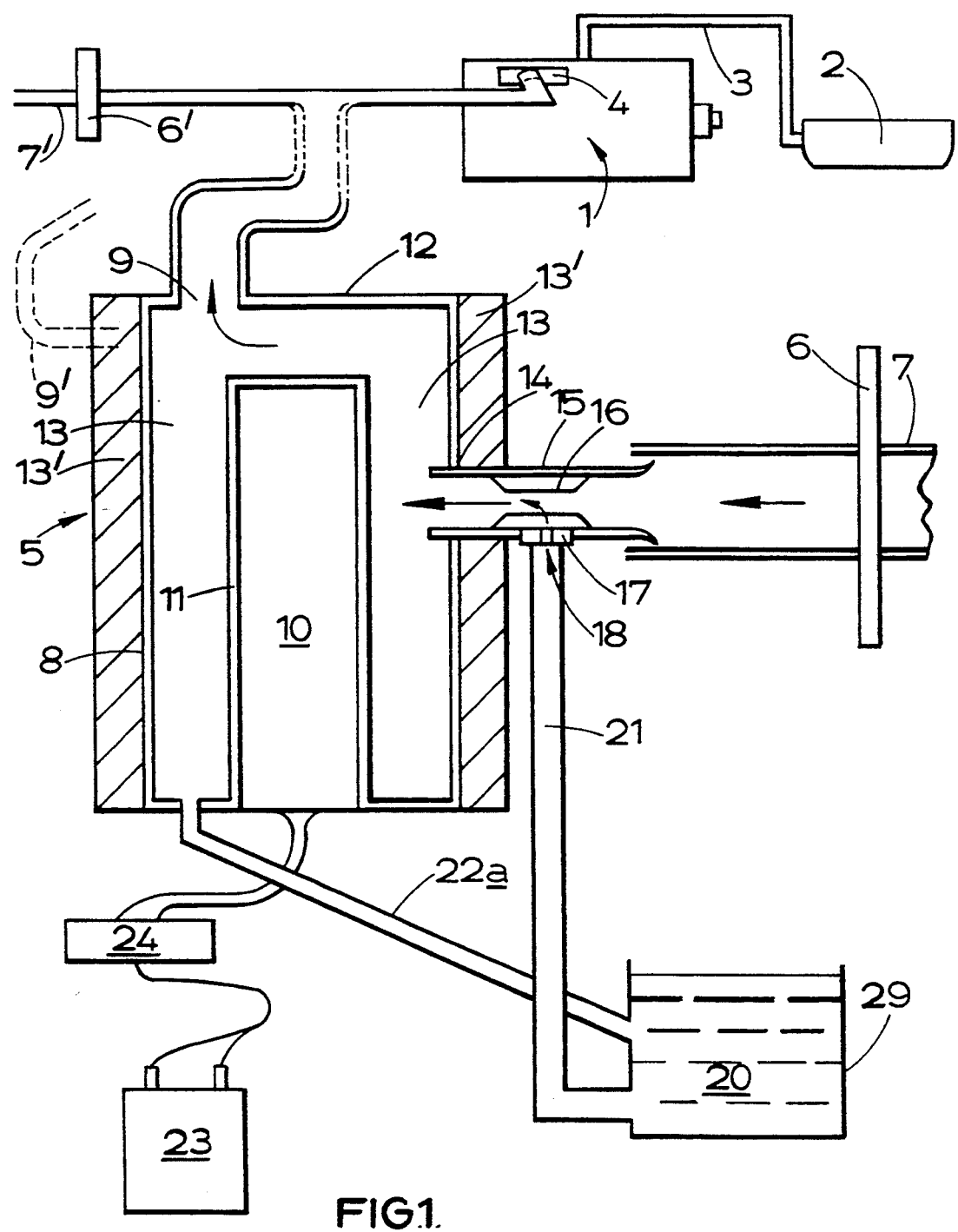
FIG. 1 is a schematic illustration of a first device for adding vaporised oil to the air taken into an internal combustion engine, and an associated engine.
Figure 2:
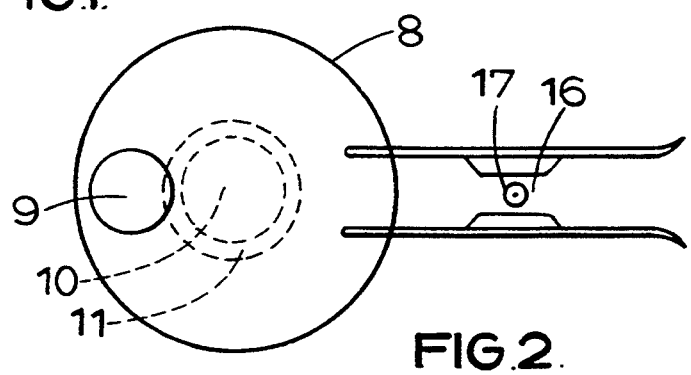
FIG. 2 is a schematic plan view of the device of FIG. 1.
Figure 3:
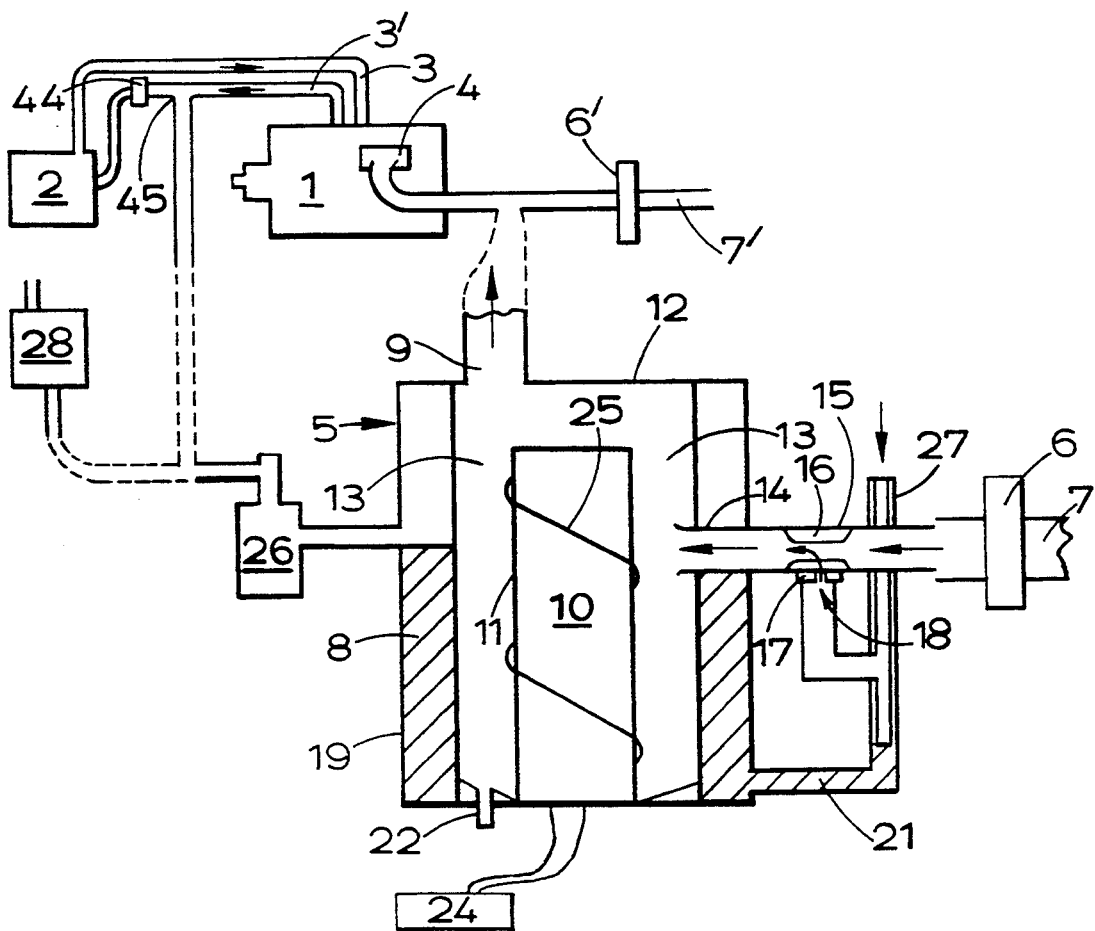
FIG. 3 shows a modification of the apparatus of FIG. 1.
Figure 5:
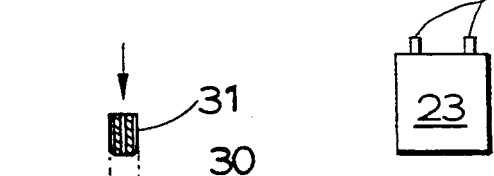
Figure 4:
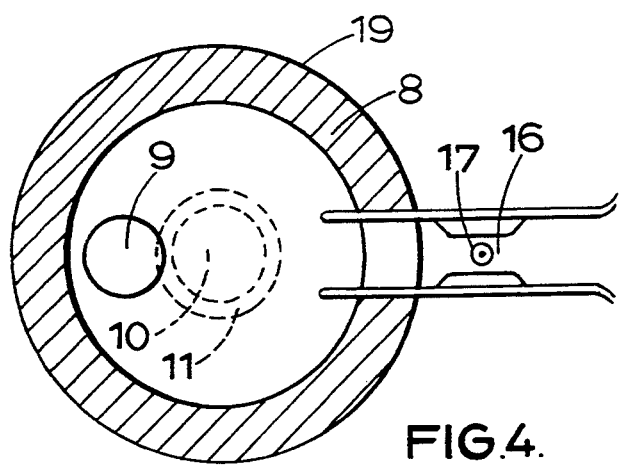
FIG. 4 is a schematic plan view of the device of FIG. 3.
Figure 6:
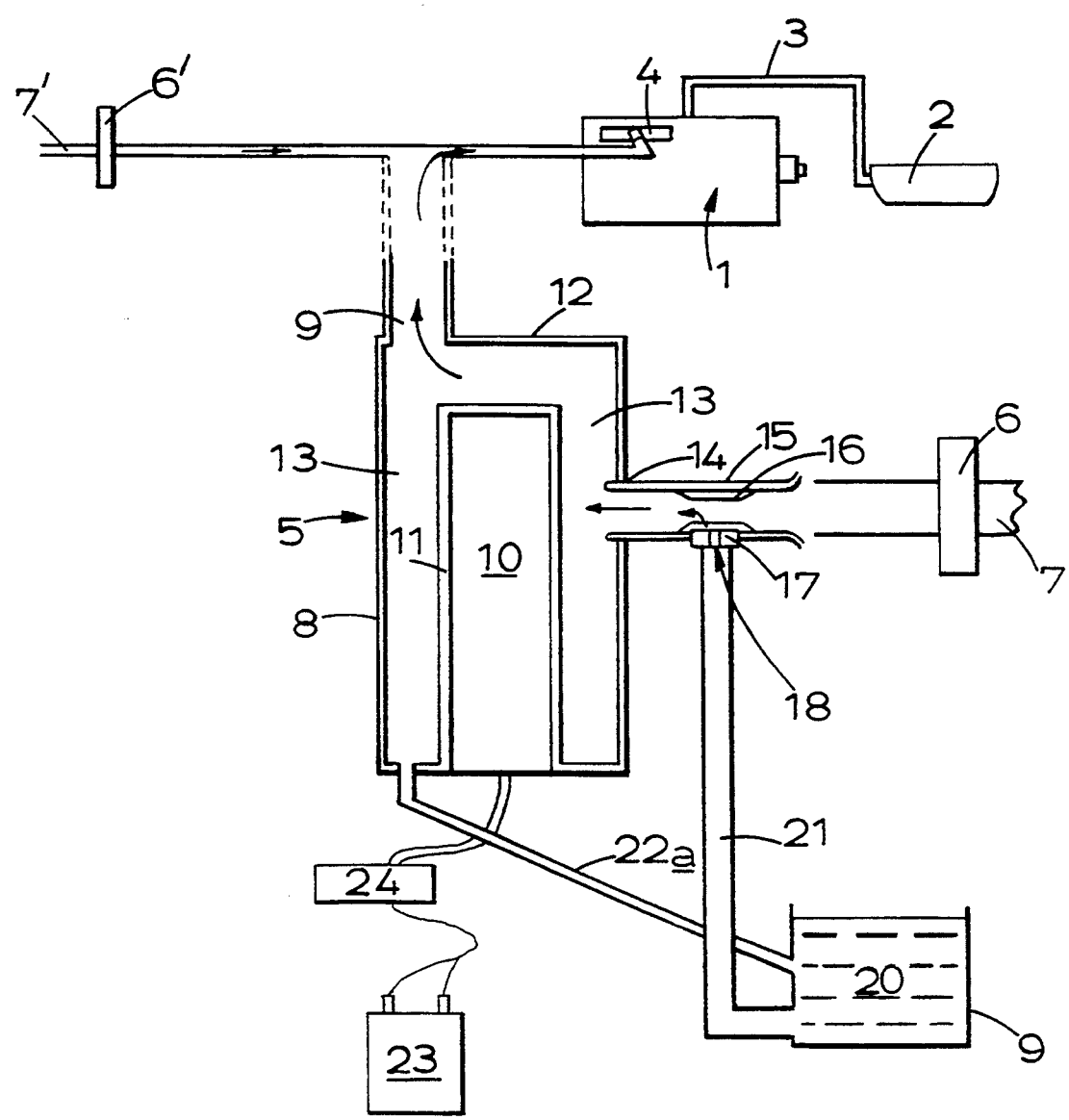
Figure 7:
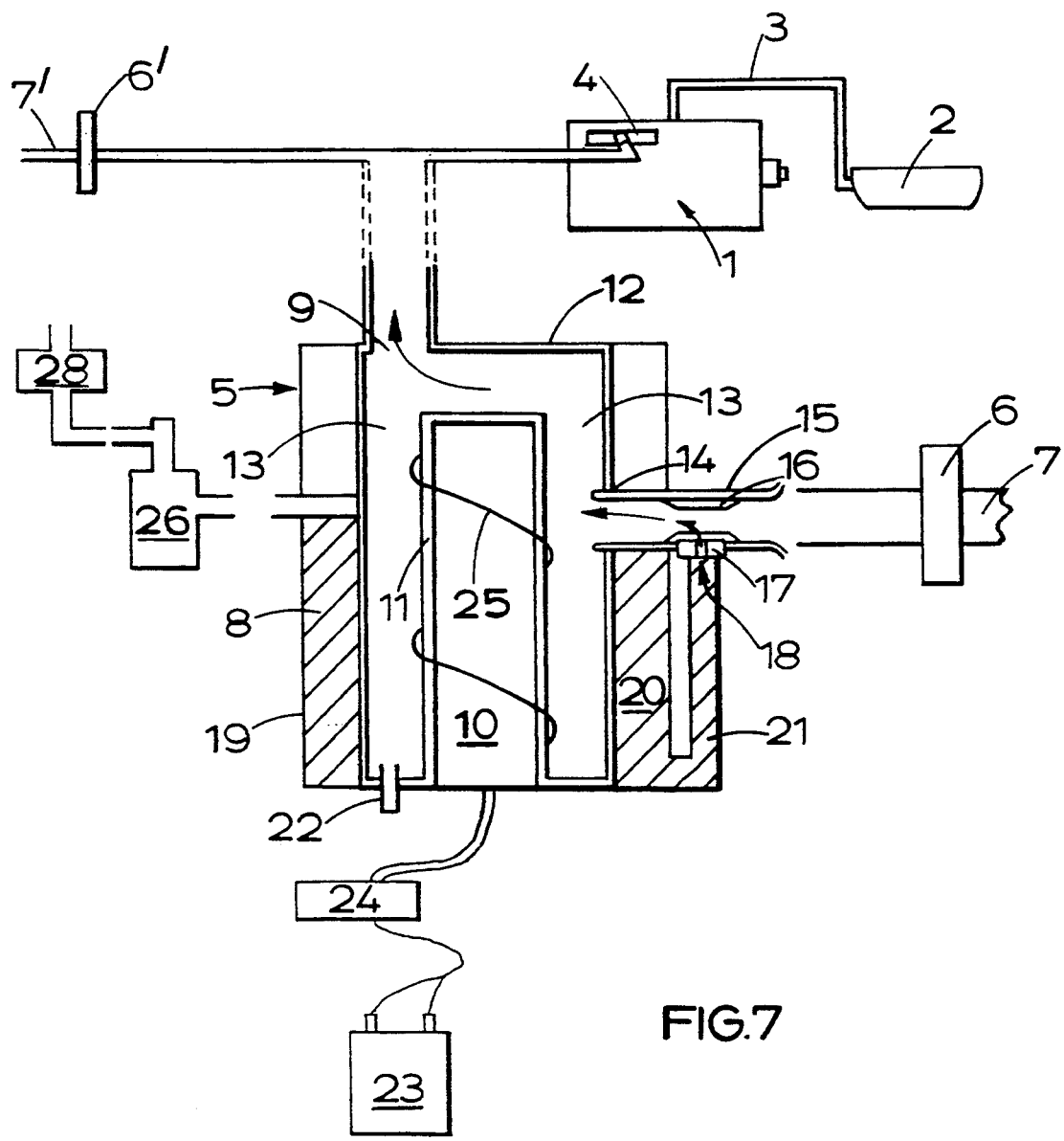
Figure 8:
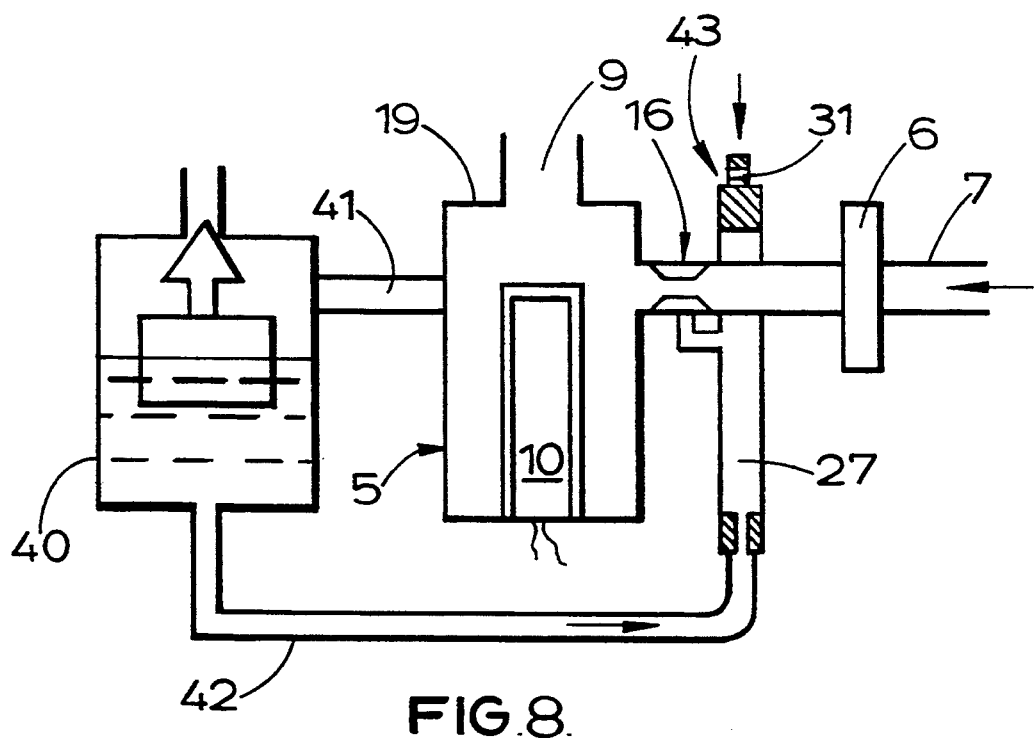
Figure 9:
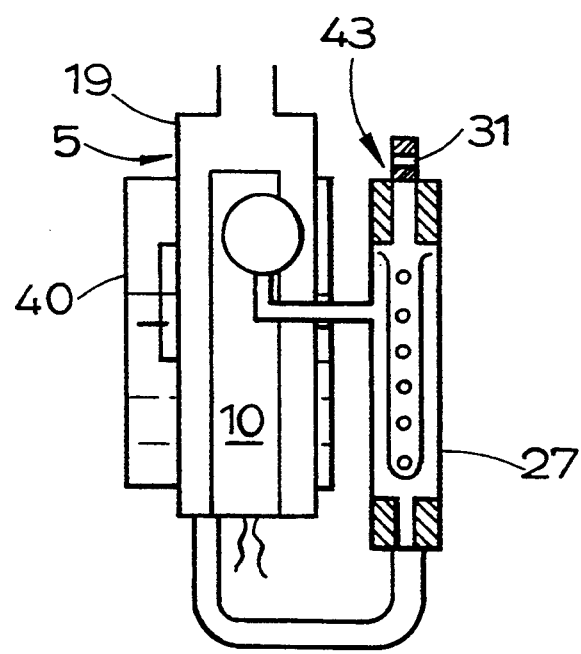
Figure 10:
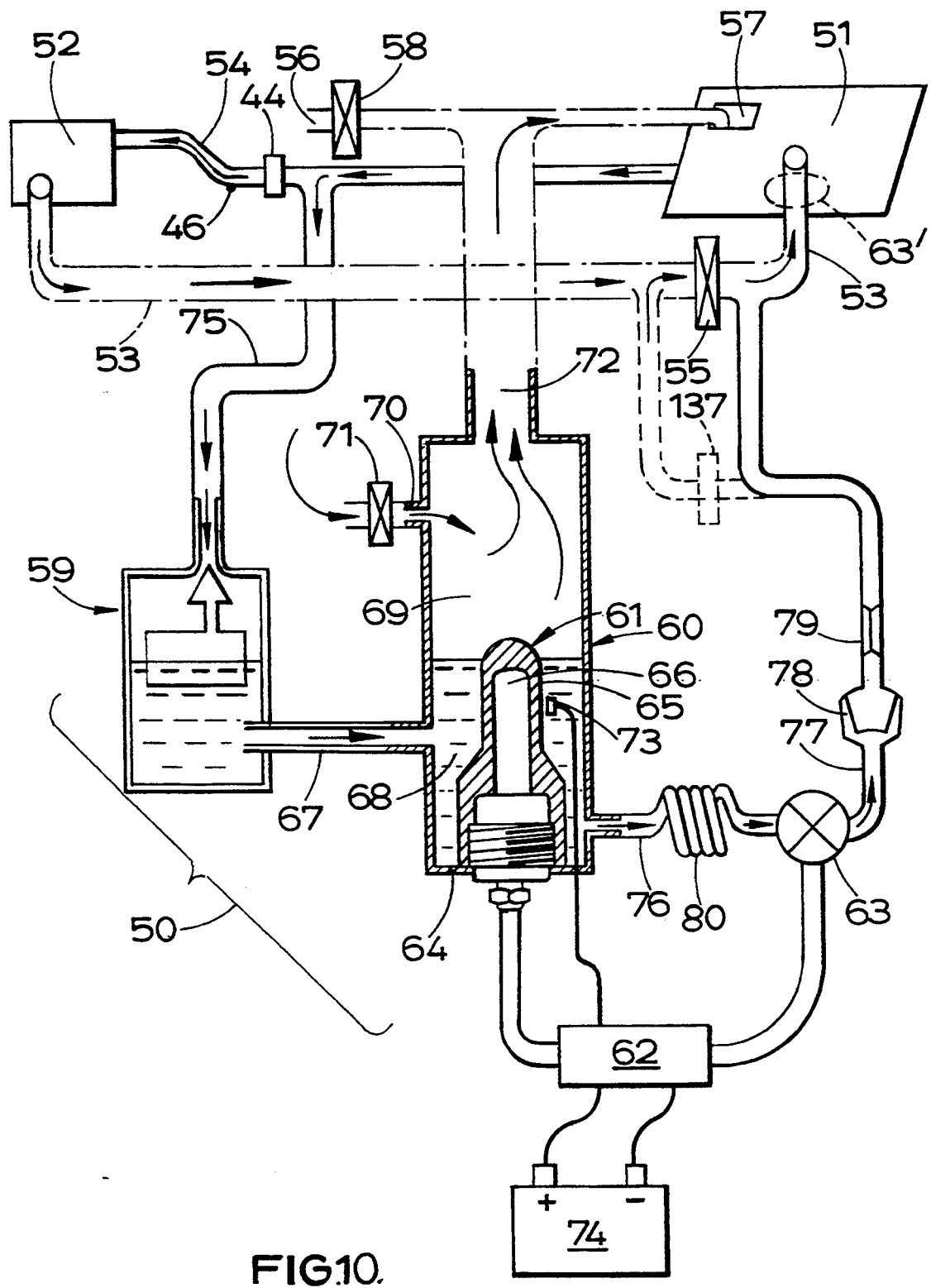
Figure 11:
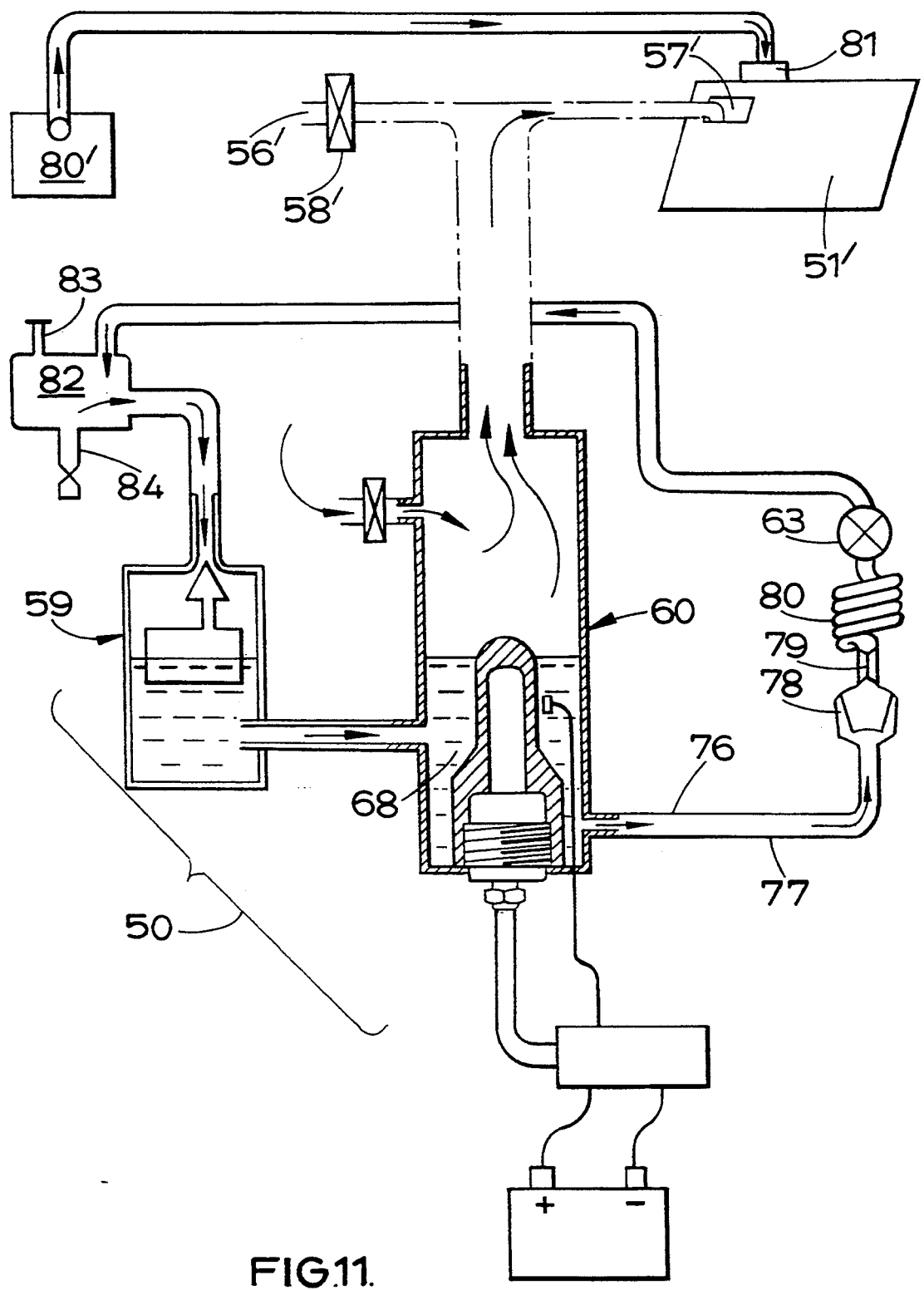
Figure 12:
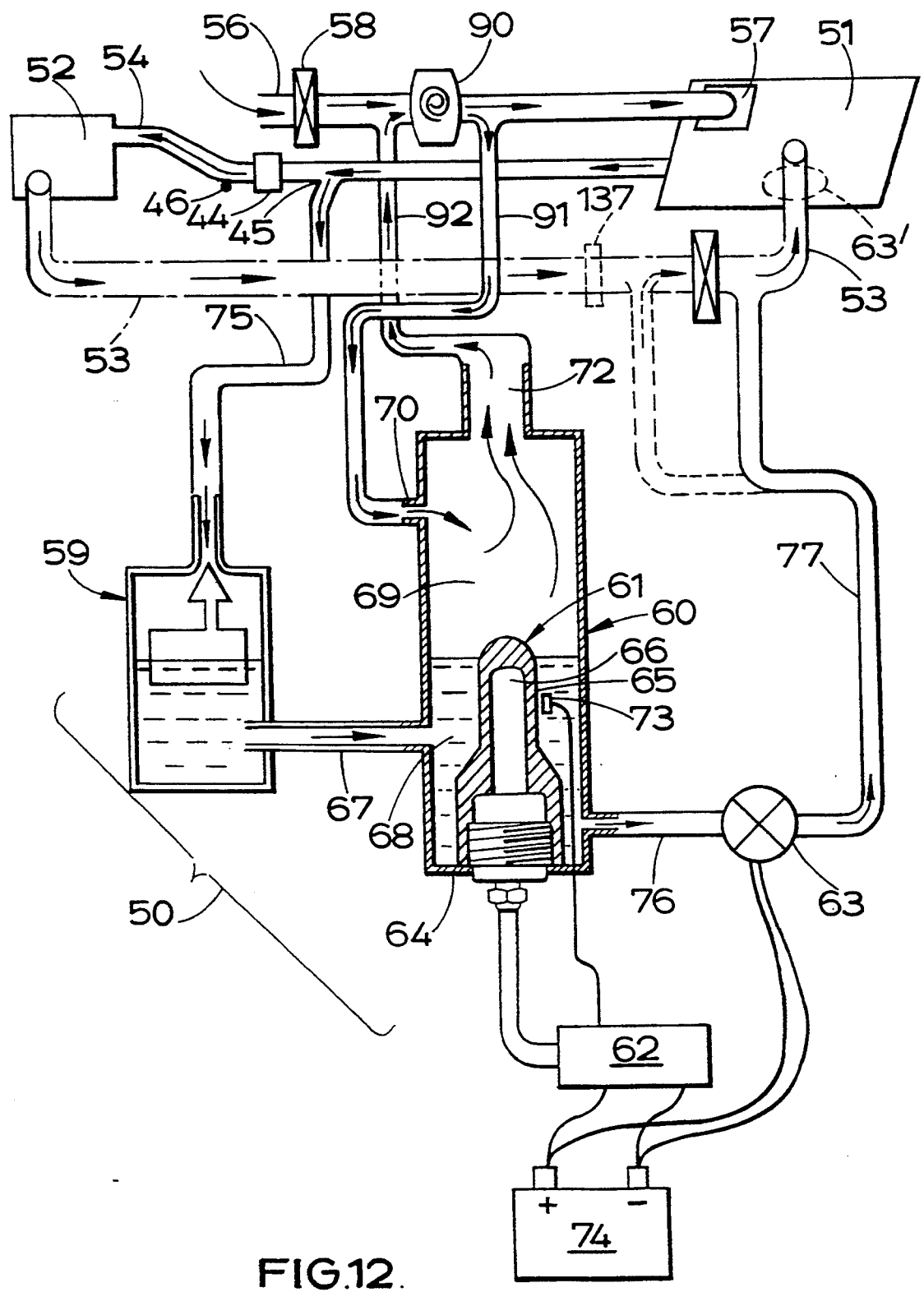
Figure 13:
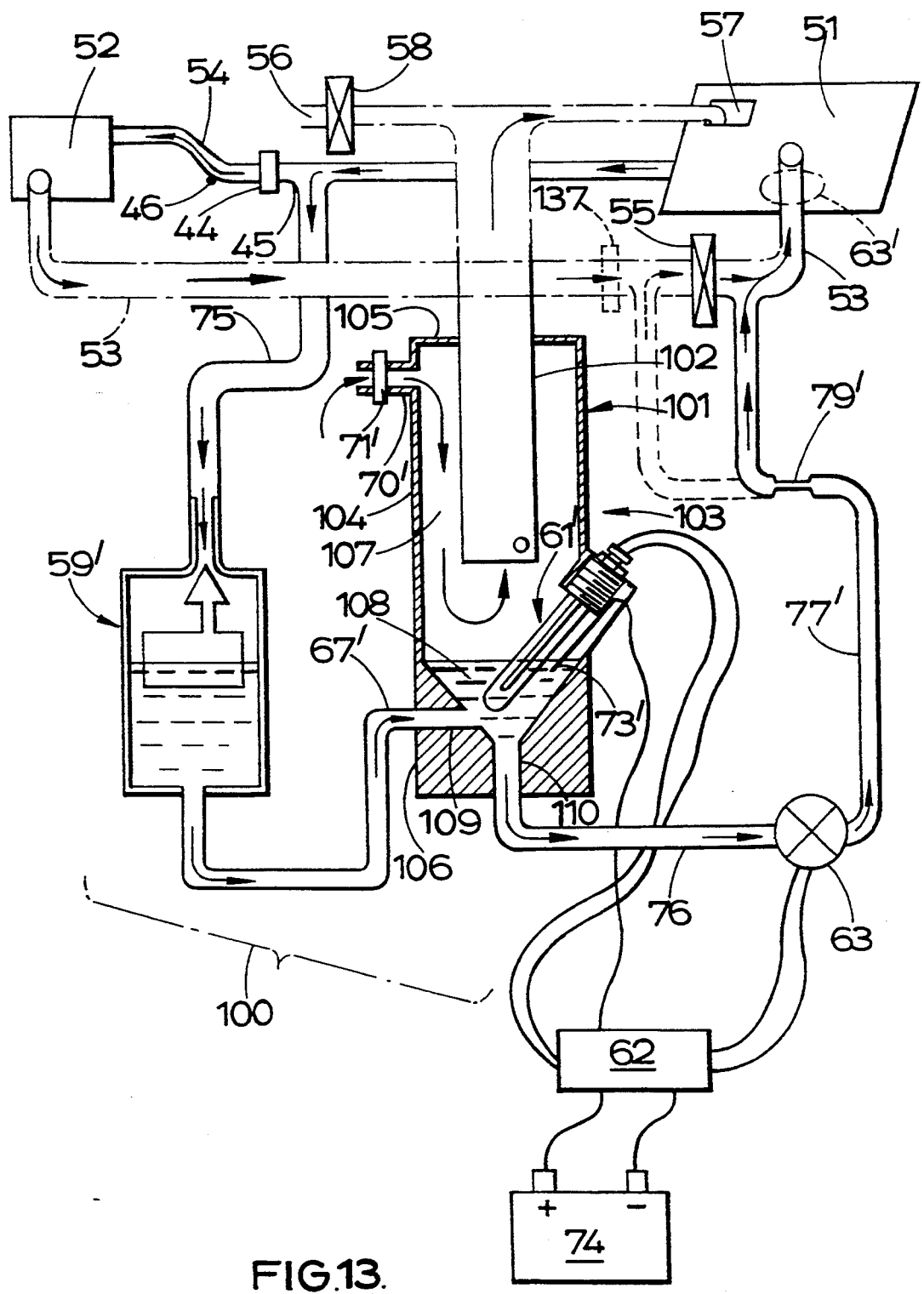
Figure 14:
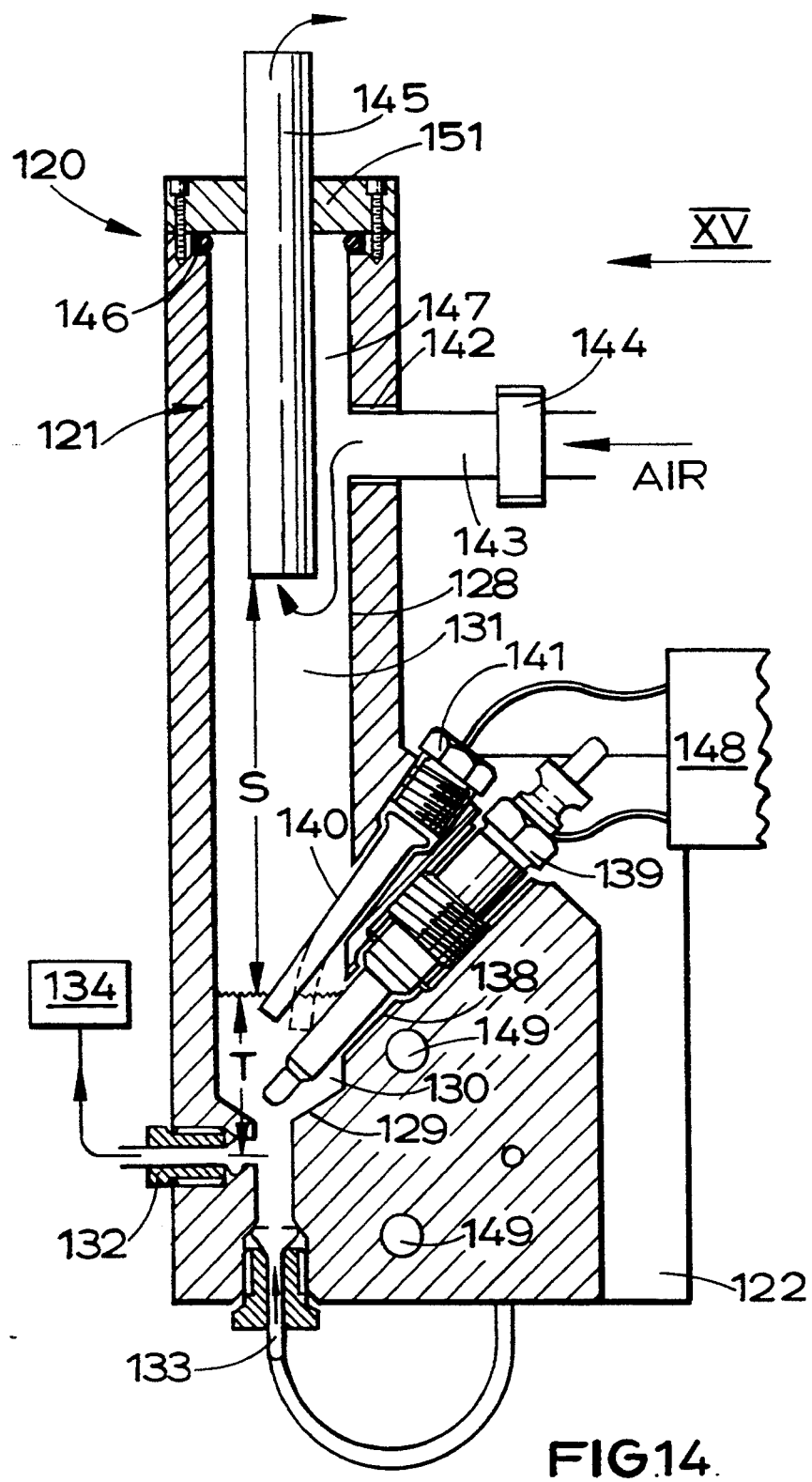
Figure 15:
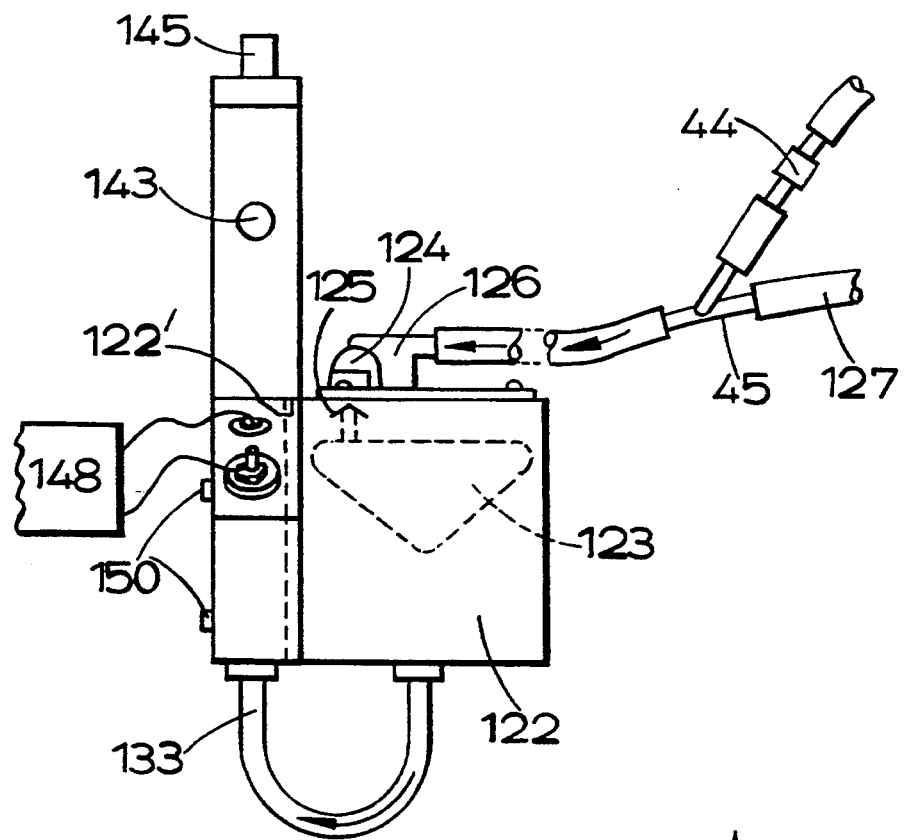
Figure 16:
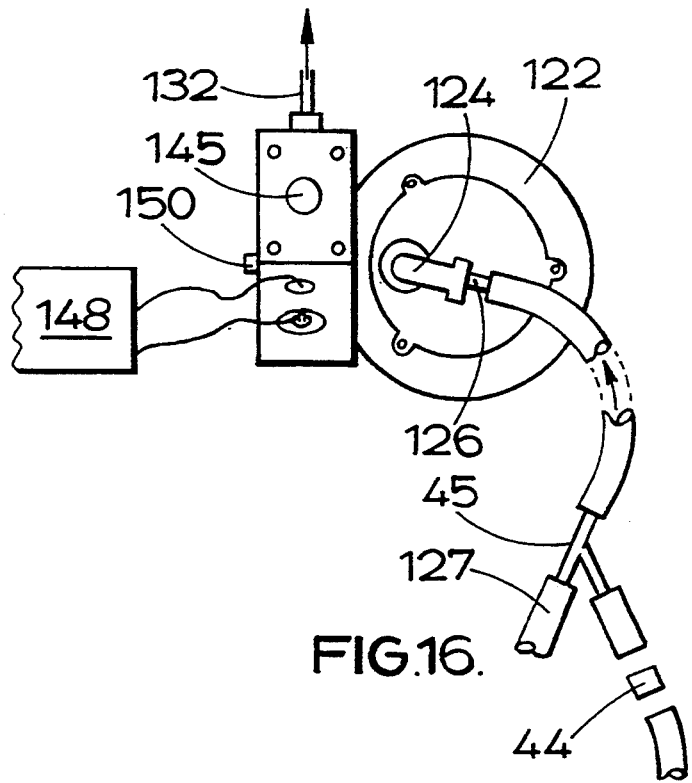
Figure 20:
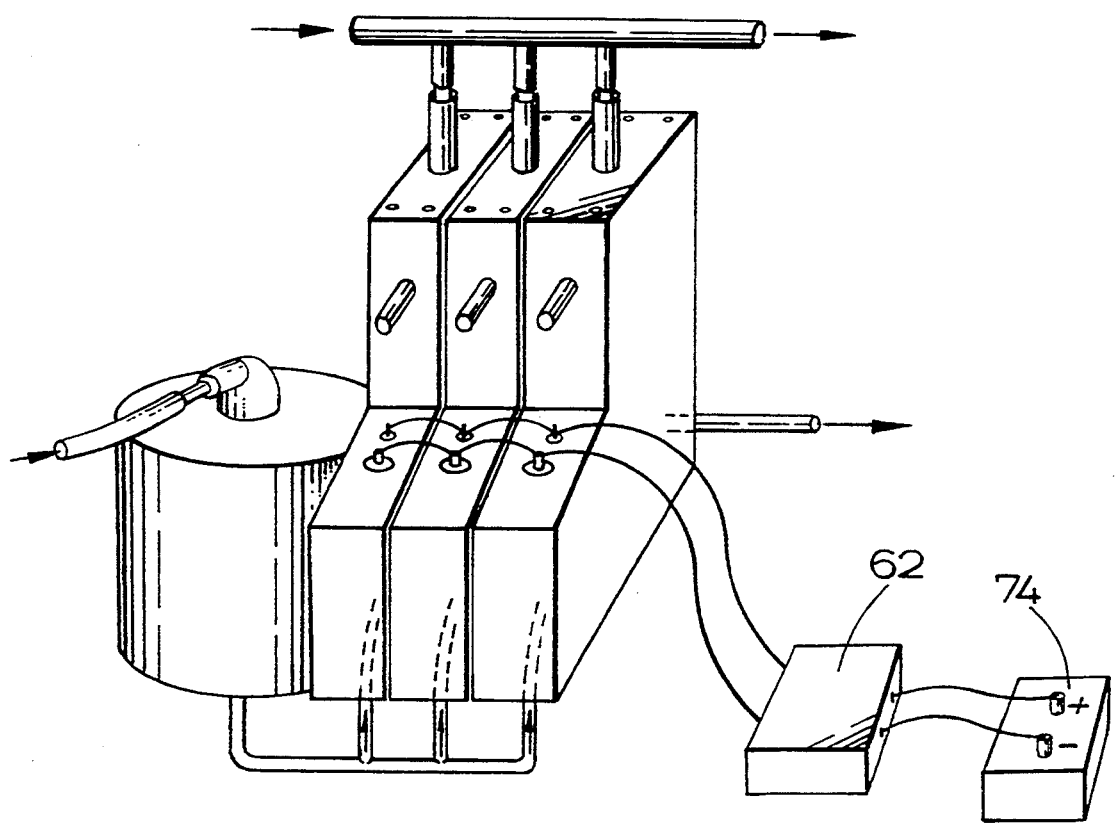

FIG. 5 is a view of an emulsion tube for the apparatus of FIGS. 1 and 2, the apparatus of FIGS. 3 and 4, and FIGS. 6 and 7;

FIG. 6 shows a modification of the use of the device of FIGS. 1 and 2 in which the device is fitted to a petrol engine instead of a diesel engine;

FIG. 7 shows a modification of the apparatus of FIGS. 3–5;

FIGS. 8 and 9 illustrate schematically combined float chamber and gasifier unit;

FIG. 10 shows schematically a diesel engine fitted with a different gasifying device;

FIG. 11 shows a petrol engine fitted with the gasifying device of FIG. 10;

FIG. 12 schematically shows the gasifying device of FIG. 10 fitted to a turbo charged diesel engine;

FIG. 13 schematically shows a diesel engine fitted with a gasifying device similar to that of FIG. 10;

FIG. 14 is a cross section through production version of a gasifying device;

FIG. 15 shows a side view of the device of FIG. 14 as viewed along arrow XV;

FIG. 16 shows a top view of the device of FIG. 14;

FIGS. 17 and 18 show cross-section and plan view of a modified gasifying device;

FIGS. 19a to 19d show schematically different airflows which are possible for devices similar to that of FIG. 14; and FIG. 20 illustrates another modified device.

An internal combustion engine 1 of a vehicle (not shown) is schematically illustrated in FIG. 1 and is fed diesel fuel from a fuel tank 2 via pipeworks 3 and a fuel injector (not shown). The engine 1 has an air intake manifold 4 to which is attached a performance enhancing device 5 interposed between the air intake manifold 4 and an air filter 6', provided in an air intake pipe 7'. The device 5 has its own air inlet pipe 7 and associated filter 6, as will be described later.

The device 5 comprises a cylindrical body 8 having an outlet 9 at its top connected to the air intake manifold 4. A cylindrical heater 10 extends from the base of the body 8 towards the top and is centrally disposed in the body. A tubular metal sleeve 11 completely surrounds the heater 10. The body 8 has a top wall 12. An annular space 13 is defined between the sleeve 11 and the body 8. The body 8 has an aperture 14 in its side wall through which a tube 15 projects into the space 13 at a plan position diametrically opposed from the plan position of the outlet 9. The tube 15 contains a restricted passageway 16 and is connected to the downstream side of the air inlet pipe 7 of the device and the device's air inlet filter 6.

The wall of the tube 15 has a circular screw-in plug 17 at the centre of the region of the tube 15 which defines the restricted passageway 16. The plug 17 has an oil-inlet aperture 18 which is in communication with a reservoir 29 of oil 20 via an oil-supply pipe 21. An oil spill, or drain, pipe 22a communicates the bottom of the space 13 with the reservoir 29. The heater 10 is connected to the battery 23 via an electronic controller 24. The oil which can be obtained from most petrol stations, but a range of hydrocarbons, or other potential, volatilisable, ignition accelerators supplied from a suitable additional reservoir, could be used at different temperature settings.

An insulating jacket 13' surrounds the body 8 to reduce heat loss. The jacket 13' may be made of Rockwool. It will be noticed that in the embodiment of FIG. 1 the insulation does not extend out as far as the aperture 18. This is because it has been found that if the diesel oil passing through the aperture 18 is too hot polymer additives in commercially available diesel fuel (such as anti-wear polymer additives) can come out of solution and block the aperture.

An alternative position for the outlet 9 is shown in dotted lines and is referenced as 9'.

When the vehicle's engine is started the electronic controller 24 causes the heater 10 to take current from the battery 23 and heat up to temperatures that can be made to range from 250° to 460° C. by a choice of the wattage of the heater 10 and/or adjustment of the controller 24.

The temperature chosen would be commensurate with the particular oil used. In the case of diesel fuel oil it would be at the top end of the stated range. The heater in turn heats the sleeve 11 to substantially the same temperature. At this temperature any oil droplets or mist of the chosen hydrocarbon which strike the sleeve 11 will be gasified instantly.

When the engine is running there is suction at its air intake manifold 4 which draws in air from the chamber 13. This, in turn, causes air to be drawn into the chamber 13 through the restriction 16. Air flows quickly through the restriction 16 and a venturi low-pressure effect is created at the restriction. The oil inlet aperture 18 thus experiences a low pressure and oil 20 is sucked up from the reservoir 29 (which is exposed to atmospheric pressure). The size of the aperture 18 controls the amount of oil entering the airflow at the restriction 16 for any given pressure difference which is governed by the engine's swept volume and rate of revolution.

Thus the air which enters the chamber 13 has droplets of oil and some vapour therefrom entrained in it. The air and its entrained vapour and droplets of oil are heated in the annular space of chamber 13 to about 250° C. when the heater 10 is set at the upper end of its temperature range, even though the heater itself is at a higher temperature. Any oil droplets which strike the sleeve 11 are gasified.

The entraining air which enters the engine 1 carries a proportion of gasified oil that is dependent on the chosen temperature of the heater and the aspiration rate of the engine which is a product of the engine's swept volume and rate of revolution. The temperature of the air entraining the gasified oil between the gasifying chamber outlet 9 and the manifold 4 is not sufficient to diminish the volumetric efficiency of the engine significantly.

Gasified oil and air enter the intake manifold 4 and this mixture improves the fuel efficiency of the engine 1 in a way which is not entirely understood, but in a compression-ignition engine is likely to involve a reduction in the delay between fuel injection and fuel ignition. It is generally accepted that optimum diesel engine performance is realised when combustion completed as early in the power stroke as possible, providing that the pressure rise does not exceed certain limiting values.

Processes that facilitate such events would permit a diesel engine to operate on the lowest cetane number fuel consistent with smooth running and it is recognised that a low cetane fuel that could be induced to ignite without undue ignition lag would provide the best overall engine performance.

One feature of such improved early combustion is the reduced amount of fuel available in the slower diffusive burning stage of combustion that terminates in soot release to the exhaust gases and lubricating oil; such soot constitutes the greater part of the lubricating oil contamination.

It is believed that when the oil is gasified at temperatures in excess of 390° C. some "cracking" of the larger paraffinic hydrocarbons will occur, and at temperatures in excess of 250° C. pre-ignition reactions between the paraffinic hydrocarbons and oxygen will occur; it is known that the rate of oxidation of paraffins, in contrast with their pyrolysis, increases rapidly with the length of the uninterrupted carbon chain.

Both chemical processes will produce lower molecular weight compounds with ignition-promoting properties that survive to reach the engine's combustion chambers because of the rapid chilling of the gasified oil once it has entered the air-stream in the inlet manifold.

Both chemical processes will produce lower molecular weight compounds with ignition-promoting properties that survive to reach the engine's combustion chambers because of the rapid chilling of the gasified oil once it has entered the air-stream in the inlet manifold. Such ignition accelerating materials together with unchanged diesel oil, are further activated in the engine during the pre-ignition processes that will occur during each compression stroke and so enhance the combustion of the normally delivered fuel in the cylinders of the engine (or in the chambers of a rotary engine). The compounds produce from the oil when it is gasified are only a small proportion of the total fuel burned, but the proportion can be subject to variation by appropriate choice of the variables available in the invention.

When the engine is run at a higher speed the inlet manifold will suck in more air and more gasified oil 20 will enter the engine per unit time. Thus there may be no need specifically to control the rate of oil delivery to the chamber since it is appropriately influenced by the oil inlet aperture 18 and the setting of the accelerator control. On the other hand fine tuning may require oil flow rate control means.

Any gasified oil which condenses on the walls of the body 8 flows down the side of the walls and gasified where it impinges on the surface of the sleeve 11 of the heater where it joins with the floor of chamber 8.

The addition of the gasified oil/air mix to the engine has been found to result in more power, less harmful exhaust emissions, and cleaner engine oil and proportionate to the fuel consumption of the engine. In general use the amount of gasified oil introduced into the combustion chambers would be about 1–2% of the total fuel burned, but could be made larger or smaller since the oil in aperture 18 responds to the engine's swept volume, the engine's rate of revolution and the load put upon the engine. We have operated an engine in which about 3% of the fuel entering the engine was gasified diesel oil. It may be desirable to reduce the proportion of gasified hydrocarbon to 0.5% or less for some engines, especially those burning petrol.

The oil 20 could be any hydrocarbon or mixture of hydrocarbons with appropriate thermal properties or some oxygen containing derivatives thereof, providing they had appropriate thermal properties; this general aspect of the system affords a way to the full realisation of the superior diesel engine function resulting from the combustion of a lower cetane fuel (that would have better "steady state" burning) without the "knock" problems resulting from its undue ignition delay.

In one preferred modification of the arrangement of FIGS. 1 and 2 oil is fed to the venturi from the main fuel tank 2 and the separate reservoir 20 is omitted. Alternatively, as depicted in FIG. 3, the oil fed to the venturi may come from a fuel return line 3' that is preferably made from rubber pipes (i.d. about 5 mm), which are narrower than the engine's standard return line fitment (i.d. about 8 mm), and which are fed oil from the injector pump, via a T or Y junction (45). The T junction 45 is adjacent the nearest convenient point for the insertion of a metal connecting tube (length about 50 mm and i.d. about 2 mm) or, more which are narrower than the engine's standard return line fitment (i.d. about 8 mm), and which are fed oil from the injector pump, via a T or Y junction (45). The T junction 45 is adjacent the nearest convenient point for the insertion of a metal connecting tube (length about 50 mm and i.d. about 2 mm) or, more preferably, the connecting tube includes a low-pressure (1.5 to 2 psi) release valve 44.

In the modified device illustrated in FIGS. 3 and 4 of the drawings the cylindrical body 8 is surrounded by an outer cylindrical wall 19 to define an annular reservoir containing the oil 20. The base of the body 8 is dished towards the base of the heater 10, and the drain plug 22 is provided at the base of the space 13, at which point an oil catch-pot could be attached.

The annular reservoir is supplied with oil from a needle valve operated float chamber 26.

The tubular metal sleeve 11 is preferably made of brass and is wound with a helical brass fin 25.

The provision of the reservoir between the body 8 and the wall 19 facilitates pre-heating of the oil before it is entrained into the tube 15.

The oil supply pipe 21 leading from the annular reservoir to the air intake pipe 14 contains an emulsion air jet 27. This comprises a regulating device which ensures that the engine is unable to suck in more oil than is needed, particularly when run at high revolutions. The amount of air entering the tube can be controlled by a throttle screw 31, screwed into the open upper end of the tube.

The cartridge heater used in the trials of the device FIG. 3 was of about 200 W capacity and reached a temperature of 235° C. (from an initial temperature of 9° C.) in about 13 minutes and 300° C. in about 20 minutes when functioning on a road vehicle on a typical April day.

In a modification, oil other than diesel from the tank 2, or the fuel return line 3', can be supplied the device 5 from a reservoir 28. In such a modification the tank 2 will be isolated from the float chamber 26.

The construction and operation of the device of FIGS. 3–5 is otherwise the same as that of FIGS. 1 and 2, and corresponding reference numerals have been applied to corresponding parts.

Although FIGS. 1 and 2, and FIGS. 3–5, refer to diesel engines, the device 5 can be used with a petrol engine providing the dimensions of the restriction 16 and the inlet aperture 18 are adjusted (if necessary) to maximise the beneficial effects engine performance that can be obtained.

The improvements observed in the performance of a spark-ignition engine may result from the pre-ignition products present in the gasified oil or from the higher molecular weight hydrocarbons present in diesel fuel (or other suitable hydrocarbons having boiling points higher than that characteristic of petrol; i.e. boiling above about 220° C.) that are entrained in the gasified oil emitted by the device. The overall effect of such substances is thought to be the promotion of combustion to a degree that markedly diminishes the amount of explosive "end gas".

FIG. 6 shows a device similar to that of FIGS. 1 and 2 but used in association with a petrol engine, in a slightly different manner. Similar reference numerals have been given to similar components.

The vapour outlet 9 of the device 5 is connected to the air inlet pipe 7' of a petrol engine 1, at the downstream side of an air filter 6'. The fuel in tank 2 is petrol.

The system of FIG. 6 operates in a similar manner to that of FIGS. 1 and 2.

Similarly FIG. 7 shows a device similar to that of FIGS. 3–5 but used in association with a petrol engine. Similar reference numerals have been given to similar components.

The fuel in the tank 2 is petrol. The vapour outlet 9 of the device 5 is connected to the air inlet pipe 7' of the petrol engine 1, at the downstream side of an air filter 6'.

The system of FIG. 7 otherwise operates in a similar manner to that of FIGS. 3–5.

FIGS. 8 and 9 of the drawings illustrate combined float chamber unit and gasifier unit which may be used in, and with, the layouts described above.

As illustrated a float chamber unit 40 for the oil or diesel is carried from the outer cylindrical wall 19 of the device 5 by means of a cantilever bar 41, and the outlet from the float chamber 40 is connected to the lower end of the emulsion tube 27 through a flexible pipe 42. Fuel in the float chamber 40 passes through flexible pipe 42 into the emulsion tube 27 where an air bleed 43 mixes small quantities of air (entering the emulsion tube through inlet throttle screw 31) with the fuel. The fuel/air then enters the venturi restriction 16 and is drawn into the unit 5 where it is gasified. Adding air to the fuel via emulsion tube 27 acts as a braking effect on the supply of fuel to the unit 5 when the engine is operating at high revolutions and prevents the unit 5 from being fed more fuel than it can gasify.

It will be appreciated that the outlet aperture 9 from the unit 5 could be in the side of wall 8 of the unit.

The diesel gasifying systems referred to in FIGS. 1 to 9 still produced gasified diesel after 1000 hours of continuous operation, even though the heated chamber 13 by then contained substantial amounts of a coke-like solid (which was partly combustible). It may be necessary to replace or clean the unit periodically to allow for the build-up of deposits.

FIG. 10 shows schematically another gasifier unit 50 connected to a diesel engine 51 of a car or other vehicle. The conventional diesel fuel tank is referenced as No 52 and a fuel supply line 53 leads to the engine to supply fuel for burning. A fuel return line 54 returns excess diesel oil from the engine 51 back to the tank 52. The fuel supply line 53 has a fuel filter 55. An air inlet 56 leads to the inlet manifold 57 of the engine and has an air filter 58.

The gasifier unit 50 comprises a float chamber 59 and a volatising chamber 60 provided with a heater 61 controlled by an electronic controller 62 which also controls the operation of a pump 63 connected to the chamber 60. The chamber 60 is generally cylindrical and surrounds the heater 61 which is mounted at the floor 64 of the chamber. The heater 61 has an outer cover or sleeve 65 and a central core element 66. The core element 66 is removable from the sleeve 65 and the sleeve 65 is sealed to the floor 64 or is integral with it.

The float chamber 59 comprises delivery means for diesel oil which is fed via a delivery pipe 67 to the chamber 60 where a pool 68 of oil collects. The pool 68 comes just to the top of the heater 61, about half way up the chamber 60. The pool 68 has a volume of about 10 cc. The upper part of the chamber 60 comprises a mixing space 69 and has an air inlet port 70 provided with an air filter 71. The top of the chamber 60 has a gas outlet 72 which feeds a mixture of gasified diesel oil and air to the air intake line leading to the manifold 57 of the engine 51. A temperature sensor 73 is provided in the chamber 60 and is connected to the controller 62, as is the vehicle's battery 74.

Oil is fed to the float chamber 59 via feeder line 75 which takes oil from the oil return line 54.

We have discovered that it is important to ensure an adequate supply of oil to the float chamber 59 at all times, and it is therefore preferable to fit pipes.

Oil is fed to the float chamber 59 via feeder line 75 which takes oil from the oil return line 54.

We have discovered that it is important to ensure an adequate supply of oil to the float chamber 59 at all times, and it is therefore preferable to fit pipes of relatively small internal diameter (about 5 mm) in the lines 54 and/or 75. This usually means introducing a section of pipe of smaller diameter into the existing fuel return line. A metal connecting tube 44 (about 50 mm long with an internal diameter of about 2 mm) or, more preferably, a low-pressure (1.5 to 2 psi) release valve 44 is introduced into the fuel return line 54.

Liquid oil is removed from the bottom of the pool 68 via an extraction line 76 which delivers heated oil through a disposal line 77, an in-line filter 78, a capillary 79, and a cooling coil 80 to a pump 63 which drives the oil to the fuel supply line 53 preferably downstream of the fuel filter 55. This arrangement is suitable when the engine has no lift pump; when a lift pump is provided it is preferred to deliver extracted oil to the upstream side of the filter 55, as shown in dotted outline in FIG. 10.

In a modification of the arrangement of FIG. 10 the diesel engine's fuel pump 63' (which most commercial diesel engines possess) may generate sufficient suction in line 77 to permit the pump 63 and its cooling coil 80 to be omitted.

When line 77 enters the fuel supply line 53 upstream of the filter 55 an anti-siphoning control may be needed for when the engine is switched off and this may be provided by a pressure sensitive valve placed just upstream of the junction of the line 77.

There is no separate anti-siphoning valve similar to valve 137 in the first embodiment of FIG. 10 (undotted line). Some commercially available fuel filters 55 have one way valves incorporated in them.

A further arrangement for disposal of the extracted oil which avoids anti-siphoning problems is that instead of having the line 77 connect to the fuel feed line to the engine it is possible to connect it to the fuel return line 54 downstream of the pressure release valve 44 (or narrow bit of tubing 44) at a position marked 46 on FIG. 10. The pressure release valve 44 is closed when the float chamber 59 requires more oil, but once the chamber 59 is full a back pressure develops in line 75 and the pressure release valve 44 then opens. This ensures that the float chamber is always full. The same effect can be obtained by having a constriction instead of a pressure release valve, so that oil tends to flow to the float chamber until a back pressure is developed.

The oil in the pool 68 is heated by the heater 61 and its lighter, more volatile, components are driven off and mix with air in space 69 and enter the air supply to the engine 51 and improve combustion. The heavier components of the diesel oil (including most additives) remain in the pool 68 and are extracted by the pump 63 (or by the engine's fuel injector pump when this alternative arrangement is possible) and are fed back into the normal fuel supply line 53 and are burned in the engine's cylinders. This disposes of the heavy components of the heated oil simply and usefully, and avoids a build up of heavy components in the chamber 60 which would reduce vaporisation and eventually clog the chamber 60. The arrangement of the inlet port 70 relative to the space 69 and the main air inlet to inlet manifold 57 ensures that there is a substantial air flow over the heated pool 68 and serves so as to purge the headspace 69 of gasified oil, entraining it and carrying it into the main airflow to the engine.

The controller 62 controls the heater and pump so as to maintain vigorous boiling of the pool of oil. The power of the heater should be such as to cause the oil to boil around the heater and to cause gasification of the oil in its vicinity to occur. The temperature of the heater is usually around 240°–280° C. in order to achieve the desired result; at this temperature some pre-ignition of the paraffinic constituents of diesel oil may occur, but this will promote the purely evaporative process.

The oil extracted from the chamber 60 could be fed directly or indirectly back to the tank 52 (e.g. through a line 46), but we prefer with engines having a self-bleeding injection pump to introduce it into the oil to be burned since in this way in addition to avoiding clogging of the fuel system and the inlet valves of the engine it also better pre-heats the fuel to be burned, which we believe to be desirable. The diesel engine system of FIG. 10 may boil off about one cubic centimeter of oil from the heater chamber for each twenty to thirty cubic centimeters of oil used by the system.

FIG. 11 shows the device 50 fitted to a petrol engine vehicle. The vehicle (not shown) has a petrol tank 80' which supplies petrol to a carburettor 81 of the engine 51' and an air intake 56' supplying air to inlet manifold 57' of the engine. A separate auxiliary fuel tank 82 containing normal DERV diesel fuel is provided and supplies diesel oil to the float chamber 59 of the device. The pump 63 is protected by a cooling coil 80 and extracts oil from the pool 68 via the extraction line 76 which contains an in-line filter 78 and a capillary 79 and feeds it back into the auxiliary diesel tank 82.

The petrol engine system of FIG. 11 may use about three cubic centimeters of diesel oil for each liter of petrol which it uses.

The balance of the composition of the oil being gasified will change over a period (usually weeks or months) and eventually it may be necessary to replace the oil in the tank 82 with fresh oil in order to avoid deposits blocking the system, and to maintain a sufficient output of vapour products. The tank 82 is shown with a capped filler inlet 83 and a drain outlet and tap 84 for this purpose. A one liter tank 82 may need to be drained and re-filled with diesel oil every, say, 2,000 miles (or as soon as the contents of the reservoir became a very dark brown in colour which would indicate too much of the heavy components in the oil).

It will be appreciated that in a modification of the arrangement of FIG. 11 heated liquid oil extracted from the chamber 60 could be added to the petrol supply line, or at least a proportion could be so added. It may be desirable to arrange for extracted oil to be added to the petrol only when the engine is hot. It may be desirable to burn the extracted oil at periodic intervals only, in order to "clean" the oil in the tank 81 of its heaviest components. Burning of the oil could be arranged to occur automatically for a number of miles every few hundred miles travelled by the car.

In other modifications of the systems of FIGS. 10 and 11 the pump need not be controlled by the electronic controller, but could just operate continually to circulate oil through the heater chamber. In such an arrangement there should be a filter 78 and a calibrated restriction 79 in line 77 leading to or from the pump chosen such as to give the desired flow rate and the pump should be protected by a cooling coil 80. These latter items could form part of a kit for retro-fitting to an existing engine, different restrictions being provided for different engines. When a separate dedicated pump is provided to control the flow rate such flow controlling items may or may not be needed.

FIG. 12 shows an arrangement similar to that of FIG. 10 and similar components have been given similar reference numbers.

The arrangement of FIG. 12 differs from that of FIG. 10 in that the engine 51 is provided with a turbocharger 90 in its main air inlet line; the air supply to and delivery from the chamber 60 is different; there is no need for separate air filter 71; and the pump 63 is free-running (it is not controlled by the controller 62).

Air at higher than atmospheric pressure (when the turbocharger 90 is operating) is bled from the main air inlet line, via bleed line 91, from downstream of the turbocharger 90. The bleed line 91 supplies air to the inlet 70 of the chamber 60. This air entrains gasified DERV diesel oil in space 69 and is blown out through outlet 72 and, via outlet delivery line 92, is delivered to the main air inlet line upstream of the turbocharger. The line 91 may have a restriction to control the volume of air blown into the space 69.

This air supply arrangement avoids problems which may otherwise occur if the positions of the lines 91 and 92 relative to the turbocharger were different. The air supply arrangement for the gasifying unit may be applicable to other gasifiers which need not be in accordance with the aspects of the invention relating to the structure of the gasifier unit per se.

An alternative way of creating an airflow over the heater 61 might be to modify the arrangement of FIG. 10 by adding a fan to blow air into inlet 70. This may be used in addition to or instead of the flow arrangement of FIG. 12 for turbocharged engines.

FIG. 13 illustrates a modified gasifying unit 100, used in a configuration similar to that of the unit 50 of FIG. 10. Similar reference numerals have been given to similar system components.

The gasifying unit 100 comprises a fuel heating unit 101 and a fuel delivery unit. The fuel delivery unit is a float chamber 59'. The fuel heating unit 101 comprises a heater 61', a gas/vapour outlet pipe 102, and a main body 103 having a tubular upper portion 104, a top end face 105, and a base region 106. The upper portion 104 has an air inlet 70' provided with an air filter 71' near to the top end face 105. The air inlet 70' opens into an annular mixing chamber 107 defined between the tubular wall of the upper portion 104 and the gas/vapour outlet pipe 102. The base region 106 defines a reservoir or pool 108 of oil having a generally conical shape, a fuel delivery inlet bore 109, a fuel outlet bore 110, and a bore adapted to receive the heater 61' in a sealing manner. The heater 61' extends into the pool of oil from above at an inclined angle. A thermocouple 73' is also provided. The outlet pipe 102 has an open bottom end and is spaced a distance above the surface of the pool of oil, the importance of which is described with reference to FIG. 14. The fuel disposal line 77' has a calibrated restriction 79' such as to restrict the flow rate of oil extracted from the pool 108 to that desired. This is especially useful when no pump 63 is provided and the liquid oil is extracted from the pool 108 by the action of the vehicle's normal fuel pump 63'. With this arrangement an anti-siphoning control 137 (which is now shown in dotted outline in line 55) may be needed as previously described. Providing a calibrated restriction allows the same add-on kit to be fitted to vehicles with different capacity pumps 63' since the flow rate is controlled by the-restriction rather than the particular pump.

The unit 5, 50 or 100, of any of the embodiments shown could be provided with, or surrounded by, insulation. Preferably the float chamber and the inlet for oil at the venturi is not insulated in order to avoid it becoming too hot.

FIG. 14 shows one possible production version of a vaporising unit 120 which is similar to the unit 100. The figure is life-sized. The unit 120 has a main body 121 machined from a block of metal (preferably aluminium) and an aluminium float chamber sub unit 122 attached to the main body 121 with screws 150 via holes 149 in the main body. The float chamber unit has a float 123 controlling a valve 124 provided at the inlet 125 for diesel oil. An inlet pipe 126 is provided to connect the float chamber to the fuel return line 127 (shown schematically in FIGS. 15 and 16). The return line 127 is made from narrow bore (i.d. about 5 mm) rubber pipe between the injector pump and the connector 44 (i.d. about 2 mm) (or low pressure (1.5 to 2 psi) release valve 44) via the metal Y junction 45 aligned to favour flow to the float chamber.

The body 121 has a main bore 128 defining a reservoir 129 for a pool of oil 130, and a mixing or gasifying header space 131; an oil inlet bore 133 communicating the reservoir with the oil in the float chamber unit; an oil extraction bore 132 communicating the bottom of the reservoir 129 with the fuel injection line 134 of a diesel engine downstream of the main fuel filter provided in the line 134. Alternatively the oil extraction bore 132 may be connected to the line 134 upstream of the filter as shown in FIG. 13, or at point 46 described with reference to FIG. 10. The body also defines a heater bore 138 adapted to sealingly receive a screw-in heater 139; a thermocouple bore 140 adapted to receive a thermocouple 141 (which may be screw-in); and an air inlet bore 142. An inlet pipe 143 is fitted in the inlet bore 142 and is provided with an air filter 144. The body 121 also has a shoulder 122' against which the float chamber unit abuts. This ensures that the body and float chamber are always in the same relationship to each other and avoids unwanted variations between successive products.

Of course, the direction of flow of oil to the pool of FIG. 14 could be reversed, along the lines of that of FIG. 13.

A gas outlet pipe 145 extends into the main bore 131 and the top end of the bore 131 is sealed by an O-ring 146 held down by a screwed-on lid 151. An annular circulation space 147 is defined between the bore 128 and the outside of the pipe 145. The bottom end of the pipe is open. The top end of the pipe communicates with the clean air side of the inlet manifold of the diesel engine and provides a mixture of gasified diesel oil and air to the air inlet.

An electronic controller 148 controls the operation of the heater 139 in response to signals from the thermocouple 141 in order to keep the temperature of the surface of the pool of oil at about 240° C.

The thermocouple 141 may touch the heater 139 so as to avoid the need for oil to conduct heat to The thermocouple may be bent down as shown in dotted lines, or the bore for it may be angled such that contact is made, or the thermocouple and heater could comprise a single unit.

The distance between the level of the bottom of the pipe 145 and the surface of the pool of oil 130 is shown as distance 'S'. The distance between the level of the oil outlet 132 and the level of the surface of the pool of oil 130 is shown as distance 'T'. Distance 'S' is about 60 mm. If it is too much larger than this we have found problems in entraining enough vaporised oil in the air supply to the engine. If it is too much less than 60 mm we have found that the oil vapour boiled off is too wet and may contain very fine droplets of liquid oil. This may increase the risk of engine oil dilution from diesel droplets dissolving in oil on the cylinder walls during the induction stroke.

We prefer to have distance 'T' about 25 mm. If it is too small air bubbles may enter the liquid oil being vaporised oil in the air supply to the engine. If it is too much less than 60 mm we have found that the oil vapour boiled off is too wet and may contain very fine droplets of liquid oil. This may increase the risk of engine oil dilution from diesel droplets dissolving in oil on the cylinder walls during the induction stroke.

We prefer to have distance 'T' about 25 mm. If it is too small air bubbles may enter the liquid oil being extracted from the pool 130 and so may cause problems in the injector pump.

We prefer to have the air inlet bore 142 as near to the top of the main bore 128 as is convenient. The inlet 142 should be spaced from the surface of the pool of oil by at least a critical distance. We believe that when a diesel engine is at idle the opening and closing of its inlet valves can cause a series of waves of back pressure in the air supply pipes. This can cause gasified oil in the space 131 to be forced out of the inlet pipe 143 if the column of air between the surface of the pool of oil and inlet to atmosphere of the pipe 143 is too short. We believe that a column of air of at least 60 to 70 mm, and preferably more, should be provided. If the height of the bore 142 is reduced then the length of the pipe 143 should be increased to compensate and maintain a long "column" of air.

The unit 120 is arranged in a vehicle as shown for the unit 100 in FIG. 13, the restriction 79' being a tube of about 0.7 mm in internal diameter (or less) and The heavier components of the diesel are not boiled off, but they do not remain in the pool 130, instead they are extracted via outlet 132 and fed to the fuel injection line leading to the engine, where they are burned. Thus liquid oil is continually passing through the pool 130 and residues derived from heated diesel are not allowed to build up in the pool and clog the system. For the maximum rate of vapour production (all other variables being constant) there will be a particular rate of flow of diesel through the system.

In secret trials we have found that when the system of FIGS. 13 or 14 was fitted to vehicles with a diesel engine and the system operated as described there was an improvement in fuel economy (or looked at another way increases in power), a reduction in particulate emissions in the exhaust gases, and a smoother running engine, and the vehicles were thought by their drivers to drive more like petrol-engined vehicles than diesel-engined vehicles.

When a 1982 Volkswagen 1600 cc diesel engine was fitted with the device it was found that good results were obtained when about 63 parts of liquid diesel was burned in the engine for every 1 part of gasified diesel. The flow rate of liquid oil out of the pool 130 was preferably about 700 cc hr−1; about 70 cc hr−1 of the oil entering the pool being gasified. Thus we only vaporise a small part of the oil entering the pool and dispose of the rest.

FIGS. 17 and 18 show a modification in the position of the outlet 132 which may reduce the risk of air bubbles being present in the oil passing through the outlet 132. The flow rate of liquid oil out of the pool 130 was preferably about 700 cc hr−1; about 70 cc hr−1 of the oil entering the pool being gasified. Thus we only vaporise a small part of the oil entering the pool and dispose of the rest.

FIGS. 17 and 18 show a modification in the position of the outlet 132 which may reduce the risk of air bubbles being present in the oil passing through the outlet 132.

FIGS. 19a to 19d show different air flow arrangements for the device. The different airflow arrangements tend to deliver different amounts of gasified diesel to the engine. The amount of gasified diesel increases in the sequence FIG. 19b, FIG. 19a, FIG. 19c and FIG. 19d. It is important to ensure that no excessive condensation of vapour occurs in the vapour outlet pipe leading to the inlet manifold.

FIG. 20 shows an arrangement of several devices arranged in parallel. This will give more gasified diesel than if just one device were used.

We envisage supplying the invention both fitted to new vehicles and as an add-on kit for existing engines. The kit may comprise the volatising chamber and heater, and the electronic controller. It may also comprise an oil supply device, such as a pump or venturi, and preferably also comprises a float chamber. The float chamber may be rigidly connected to the volatising chamber (for example in a similar manner to that shown in FIG. 8, 10 or 14).

The float chamber could be connected to the vapourising chamber, via spacers in order to avoid overheating of the float chamber. This could be achieved in other ways, for example by using insulation, but spacers are preferred. Instead of taking oil from the fuel return spill rail we could take it from some other place, for example the fuel pump overflow. The main point is that we remove oil from the normal fuel system and deliver it to the vaporising chamber.

We claim:

1. In combination, an internal combustion engine having a device connected to the air supply of an internal combustion engine, the device comprising chamber means defining a volatising chamber, an energy source for gasifying hydrocarbons, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is heated by the energy source and the lighter components of the oil are gasified in the chamber whilst the heavier components are not, the air/gasified oil mixture leaving the chamber via the gas/vapour outlet which is connected to the air supply of the internal combustion engine, and in which the device has oil extraction means provided to extract liquid, ungasified, oil from the volatising chamber, and wherein at least most of the liquid oil extracted from the device is not re-cycled to be re-heated in the device, but is instead fed to the engine, so as to dispose of the extracted oil.

2. A vehicle having an internal combustion engine according to claim 1.

3. A device for converting an internal combustion engine into an engine in accordance with claim 1, the device being adapted for connection to the air supply of an internal combustion engine, the device comprising chamber means defining a volatising chamber, an energy source for gasifying hydrocarbons, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is heated by the energy source and the lighter components of the oil are gasified in the chamber whilst the heavier components are not, the air/gasified oil mixture leaving the chamber via the gas/vapour outlet, the gas/vapour outlet being adapted for connection to the air supply of an internal combustion engine, the device having oil extraction means adapted to extract liquid, ungasified, oil from the volatising chamber and to dispose of the extracted oil by feeding it to the engine.

4. A method of reducing the particulate emissions of an existing internal combustion engine comprising fitting to the engine a device in accordance with claim 3.

5. A method of fitting the device of claim 3 to a vehicle's engine, the vehicle's engine having a fuel return line, comprising connecting the outlet to the air intake line or manifold of the engine, connecting the delivery means to the fuel return line from the engine, and connecting the extraction means to the fuel delivery line of the engine.

6. In combination, an internal combustion engine having a device connected to the air supply of an internal combustion engine, the device comprising chamber means defining a volatising chamber, an energy source for gasifying hydrocarbons, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is heated by the energy source and the lighter components of the oil are gasified in the chamber whilst the heavier components are not, the air/gasified oil mixture leaving the chamber via the gas/vapour outlet which is connected to the air supply of the internal combustion engine, wherein the oil is heated to a temperature of 210°–280° C. to gasify the lighter components of the oil and wherein oil extraction means is provided to extract liquid ungasified oil from the volatising chamber, the oil extracted from the device being fed to the engine for burning.

7. A combination according to claim 6 in which the oil is petrol or diesel.

8. A combination according to claim 6 in which the oil is supplied to the chamber from the main fuel tank.

9. A device for attachment to the air supply of an internal combustion engine, tile device comprising chamber means defining a volatising chamber, an energy source for gasifying hydrocarbons, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is gasified in the chamber and the air/gasified oil mixture leaves the chamber via the gas/vapour outlet, the gas/vapour outlet being adapted for connection to the air supply of an internal combustion engine, wherein the device has a pool of oil and a heater or glow plug extends in the pool at an angle to the surface of the pool, and wherein oil extraction means is provided to extract liquid ungasified oil from the volatising chamber, the oil extracted from the device being fed to the engine for burning.

10. A kit comprising a device for attachment to the air supply of an internal combustion engine, the device comprising chamber means defining a volatising chamber, an electrical energy source for gasifying hydrocarbons, fluid inlet means to the chamber, and a gas/vapour outlet from the chamber, the fluid inlet means comprising air inlet means for admitting air to the chamber and delivery means for delivering hydrocarbons, hereinafter referred to as oil, to the chamber, the arrangement being such that oil entering the chamber is gasified in the chamber and the air/gasified oil mixture leaves the chamber via the gas/vapour outlet, the gas/vapour outlet being adapted for connection to the air supply of an internal combustion engine; the kit also including a controller adapted to control the supply of electrical current to the energy source, and extraction means adapted to extract unvaporised fuel from the device and to pass it to the engine for burning, and wherein the kit also includes at least one of:

(a) a valve to be inserted into the flow pathway of oil connected to the volatising chamber, the valve being such as to prevent siphoning of oil from the chamber when the engine is not running; or (b) a low pressure relief valve adapted to be introduced into the oil supply line.

11. A method of supplying gasified oil to an internal combustion engine in addition to conventionally carburetted or injected fuel, comprising heating hydrocarbons, hereinafter referred to as oil, in a heating device so as to drive off its lighter components and leave behind in liquid form its heavier components; feeding the gasified oil to the air supply of the engine, and wherein ungasified oil is extracted from the heating device and is disposed of by feeding it directly to the engine for burning.

12. A method according to claim 11 in which the engine has a fuel return line and liquid oil to be heated to produce gasified oil is taken from the fuel return line of the engine.

13. A method of supplying gasified oil to an internal combustion engine in addition to conventionally carburetted or injected fuel, comprising heating hydrocarbons, hereinafter referred to as oil, in a heating device so as to drive off its lighter components and leave behind in liquid form its heavier components; feeding the gasified oil to the air supply of the engine, wherein the oil is heated to a temperature of 210°–280° C. to gasify its lighter components, and extraction means adapted to extract unvaporised fuel from the device and to pass it to the engine for burning.

14. A method of improving the burning of diesel oil injected into a diesel engine, or of petrol introduced into a petrol engine, comprising introducing into the engine a relatively small amount of gasified diesel oil by heating a pool of oil to drive off lighter components into a header space above the pool; purging the header space with a flow of air which entrains the gasified oil and takes it to the air intake of the engine; feeding liquid oil to the pool; and extracting unvaporised liquid oil from the pool, wherein liquid oil extracted from the pool is not re-cycled to be reheated in the pool.

15. A method of converting a vehicle's engine from operating on leaded petrol to unleaded petrol comprising fitting to the engine a device adapted for connection to the air supply of an internal combustion engine, the device comprising chamber means defining a volatising chamber, an energy source for gasifying hydrocarbons, fluid inlet means to the chamber, and a gas/vapor outlet from the chamber, the fluid inlet means comprising air inlet means for emitting air to the chamber and delivery means for delivering hydrocarbons, hereinafter referred to as oil, to the chamber, the arrangement being such that oil entering the chamber is heated by the energy source and the lighter components of the oil are gasified in the chamber whilst the heavier components are not, the air/gasified oil mixture leaving the chamber via gas/vapor outlet, the gas/vapor outlet being adapted for connection to the air supply of an internal combustion engine, the device having oil extraction means adapted to extract liquid, ungasified, oil from the volatising chamber and to dispose of the extracted oil by feeding it to the engine.

* * * * *